United States Patent
Statham et al.

(10) Patent No.: US 7,533,000 B2
(45) Date of Patent: May 12, 2009

(54) METHOD AND APPARATUS FOR ANALYSING A DATASET OF SPECTRA

(75) Inventors: Peter John Statham, Bucks (GB); Charles Penman, Bucks (GB)

(73) Assignee: Oxford Instruments Analytical Limited, Oxford (GB)

(*) Notice: Subject to any disclaimer, the term of this patent is extended or adjusted under 35 U.S.C. 154(b) by 168 days.

(21) Appl. No.: 11/460,657

(22) Filed: Jul. 28, 2006

(65) Prior Publication Data

US 2008/0027676 A1    Jan. 31, 2008

(51) Int. Cl.
*G06F 15/00* (2006.01)

(52) U.S. Cl. .................. 702/179; 702/28; 702/189; 702/190; 702/194; 702/196; 702/197; 250/306; 250/307; 250/308; 250/309; 250/310; 250/311; 356/300; 356/301; 356/302; 356/303; 356/304; 356/305; 356/306; 356/307; 356/308; 356/309; 356/310

(58) Field of Classification Search .............. 702/28, 702/190, 194, 196–197; 250/306–317, 336.1–395; 356/300–310
See application file for complete search history.

(56) References Cited

U.S. PATENT DOCUMENTS 6,584,413 B1 *  6/2003  Keenan et al. ............... 702/28

OTHER PUBLICATIONS

Mighell, Kenneth, "Parameter Estimation In Astronomy With Poisson-Distributed Date. I. The $X^2y$ Statistic", The Astrophysical Journal, Jun. 10, 1999, pp. 380-393, vol. 518, The American Astronomical Society.

Lucy, L.B., "Hypothesis testing for meagre data sets", Mon. Not. R. Astron. Soc., 2000, pp. 92-100. vol. 318.

"14.3 Are Two Distributions Different?", Numerical Recipes in C: The Art of Scientific Computer, 1988-1992, pp. 620-628, vol. Chapter 14, No. ISBN 0-521-43108-5, Cambridge University Press. Programs Copyright and Numerical Recipes Softwares.

Bright, D.S. et al., "Maximum pixel spectrum: a new tool for detecting and recovering rare, unanticipated features from spectrum image data cubes", Journal of Microscopy, Nov. 2004, pp. 186-193, vol. 216, Pt 2, The Royal Microscopical Society.

* cited by examiner

*Primary Examiner*—Tung S Lau
*Assistant Examiner*—Sujoy K Kundu
(74) *Attorney, Agent, or Firm*—Vern Maine & Associates (57) ABSTRACT

A method of analyzing a dataset of spectra is provided in which each spectrum has a count value for each of a number of parameter values within a parameter range. The method is for identifying one or more parameter values that exhibit a significant variation within the dataset. A dataset of spectra is obtained and a statistical analysis is applied to the count values for each of the parameter values. The result of the analysis for each parameter value is a function of the variation in the count values. A spectrum that is representative of at least part of the dataset of spectra is then displayed together with the results of the statistical analysis. A corresponding computer program and system for performing the method are also disclosed.

31 Claims, 9 Drawing Sheets

Using running total over 15 channels (80eV)

METHOD AND APPARATUS FOR ANALYSING A DATASET OF SPECTRA

FIELD OF THE INVENTION

The present invention relates to a method and apparatus for analysing a dataset of spectra. This has particular application in the field of spatial composition analysis where a series of spectra are obtained for a 1-D, 2-D or 3-D array of points in a specimen being analysed.

Another application is in the analysis of a series of spectra that are recorded at different times or for different values of another variable such as temperature. In this context, a spectrum can be thought of as a histogram showing the count values recorded for a sequence of increasing energies.

In general the histogram could be any one dimensional array of count values obtained for a set of parameter values within a parameter range (e.g. energy, frequency, wavelength, time, temperature, voltage, magnetic field and so on).

BACKGROUND

In experiments to measure photon flux for example, where the measured signal is the total count of photons recorded in a fixed time interval, successive measurements will produce different results due to statistical variation. Even if the flux is constant, successive values will be distributed according to a Poisson probability distribution with mean and variance both equal to the average expected count for that time interval. This fluctuation makes it difficult to detect small changes in flux. However, if the measurement time is extended, more counts are recorded in the time interval and the relative statistical variance is reduced so that smaller relative changes in flux can be detected. This principle applies to any experiment where the recorded counts obey Poisson counting statistics so that for example electrons, ions or other fundamental particles may be counted rather than photons.

Figure 1:
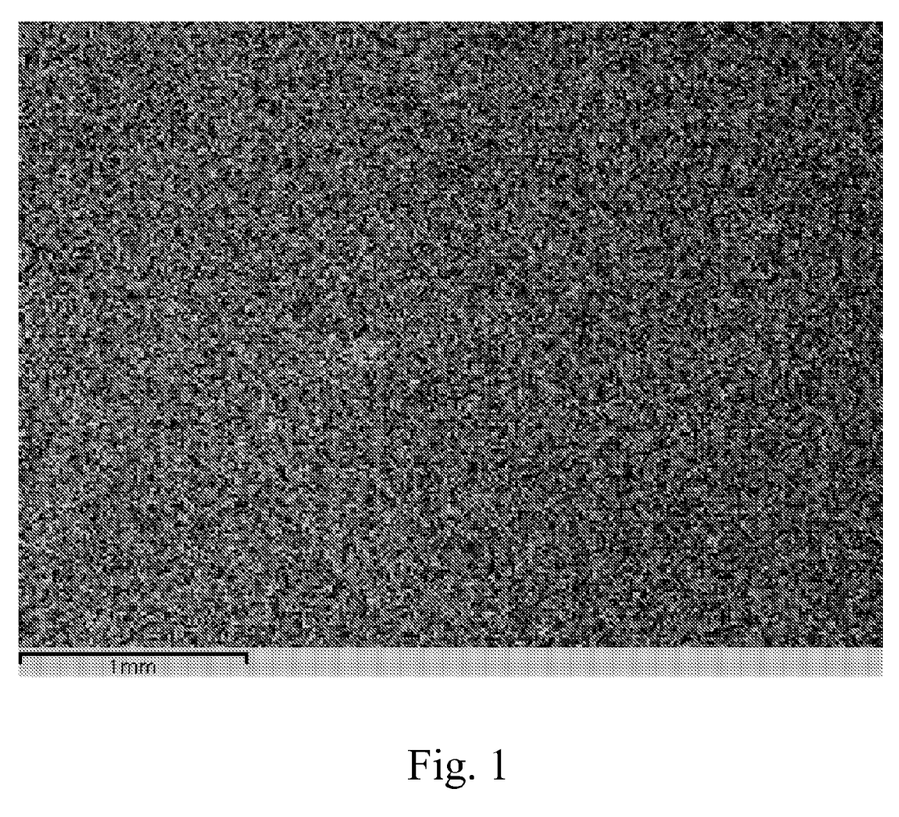
FIG. 1 shows a typical x-ray map according to the prior art.

FIG. 1 shows a practical example where a single measurement involves counting the total number of x-ray photons with energy from 0.1 to 10 keV that hit an x-ray detector within a fixed time while an electron beam is held at a fixed position on the specimen. Measurements are taken on a 2-D grid (256 by 192) of pixel positions and the results plotted as a grey scale image or "x-ray map", with an average of four counts per pixel. In FIG. 1, the statistical variation in pixel counts produces a random "noisy" appearance to the image that obscures any detail.

Although the total count does not show any clear structure in the image, the compositional variations in the specimen are likely to cause changes in the distribution of counts at different energies at each pixel. In an energy dispersive spectrometer (EDS) the x-ray spectrum is typically recorded as a histogram showing the number of photons recorded in each of a number of contiguous energy intervals called "channels" across the full range of energies. For a so-called "spectrum image" spectra are recorded at every position on a grid of pixel positions.

U.S. Pat. No. 6,584,413 describes how such spectrum images can be analysed by multivariate statistical techniques to identify systematic variations in spectra and discover properties of the sample. For this approach, the relative magnitude of systematic and random fluctuations is taken into account by some weighting scheme. To do this, the assumption is usually made that the random nature of Poisson distributed count values can be approximated by a distribution with standard deviation equal to the square root of the count value. While this is a satisfactory approximation for large count values, the Poisson distribution becomes severely asymmetric when the average count value falls below 1. As a consequence, multivariate statistical methods become less effective at very low count values where the statistical noise does not follow a normal probability distribution.

Figure 2:
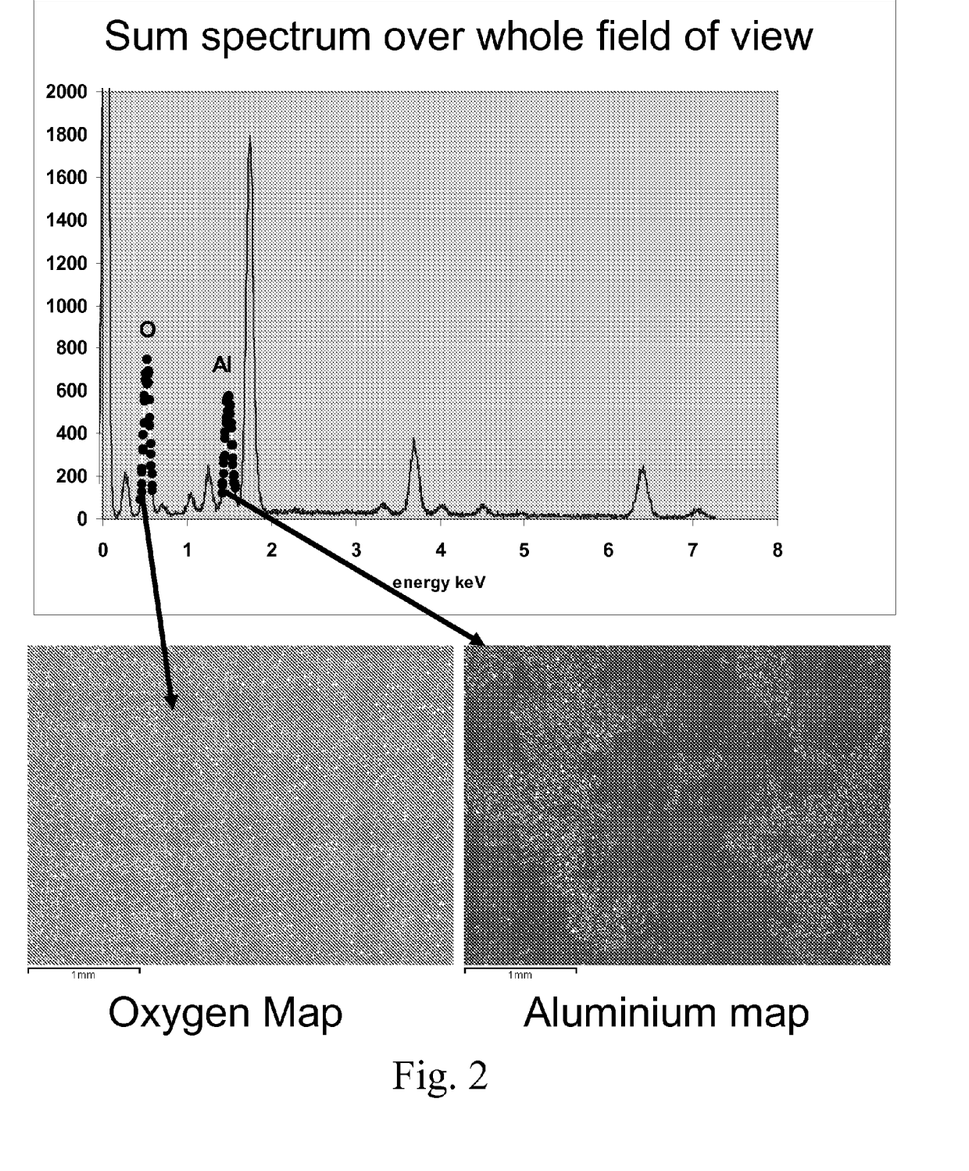
FIG. 2 shows an x-ray sum spectrum corresponding to FIG. 1 including pixel maps for the elements oxygen and aluminium according to the prior art.

When the recording time is short or the counting rate is low, there may be very few counts in a single pixel spectrum. For example, in FIG. 1, the average single pixel spectrum contains only 4 counts for the total energy range 0.1 to 10 keV, so plotting the energy histogram for a single pixel spectrum is not particularly helpful. Therefore, it is common for spectra to be summed over all pixels and the sum spectrum over the whole field viewed on a graphical display to show an aggregate response for the specimen. As shown in FIG. 2, the sum spectrum reveals a number of peaks characteristic of the elements present in the specimen. In an inhomogeneous sample, some elements will be present at every position and some elements will only be present in discrete areas within the field of view.

If an energy region of interest "ROI", is defined spanning a particular peak, then the integral count in this ROI can be calculated from the histogram for a single pixel and this count can be plotted as a function of pixel position to produce an element x-ray map. In FIG. 2 such maps have been created for oxygen (O) and aluminium (Al). Like the total count image in FIG. 1, the oxygen map in FIG. 2 does not show any structure, but the aluminium map does show some spatial variation. This spatial variation indicates that there are regions of different elemental composition in the sample.

In general it is not clear which ROI will produce x-ray maps that demonstrate variation in composition. Furthermore, the statistical variation in counts in the sum spectrum may obscure small peaks for elements that only occur in small areas in the field of view. For example, if the image consists of 256×256 pixels, then a small area of 4×4 pixels contributes a fraction of only 2.4E-04 to the total sum spectrum. Thus, if a 4×4 pixel region exhibits a different x-ray spectrum from most of the field of view, then the influence on the overall sum spectrum may be smaller than the statistical scatter in the sum spectrum.

One known way to detect rare pixels where the spectrum contains peaks not present in most of the other pixels is to compute the "maximum-pixel spectrum" ("MPS") ("Maximum pixel spectrum: a new tool for detecting and recovering rare, unanticipated features from spectrum image data cubes", D. S. Bright & D. E. Newbury, Journal of Microscopy, Vol. 216, Pt 2, November 2004, pp. 186-193). For every pixel in the grid, the count recorded in a particular energy channel is noted and the maximum count over all pixels is taken as the value for the maximum pixel spectrum at this energy channel. Bright & Newbury disclose a sum spectrum for a grid of 256×200 pixels taken with 0.5 s dwell per pixel and approximately 4000 cps count rate per pixel so that the average spectrum for a single pixel contains 2000 counts. They also show the corresponding maximum-pixel spectrum, which exhibits additional peaks for O, Cu, Si, Cl, K, Cr that are not obvious in the sum spectrum and correspond to small areas in the field with a high concentration of these elements. X-ray maps constructed from the ROI around the peaks for these elements would show where there are pixels with a high concentration of these elements. The example maximum-pixel spectrum (MPS) discussed by Bright & Newbury looks like a recognisable x-ray spectrum and represents count values for single pixels while the sum spectrum represents the total of all pixels so the magnitudes are very different.

However, Bright & Newbury show that MPS and sum spectra can be usefully compared by scaling to the maximum peak. This scaling and comparison works well for such high-count spectra where the average count per pixel varies between about 1 and 100 in a single energy channel. However, the Bright & Newbury data took 9 hours to record and in practice much smaller acquisition times may be used so that the average count per pixel may be much less than 1. In such lower count conditions the MPS exhibits unusual characteristics.

Figure 3A:
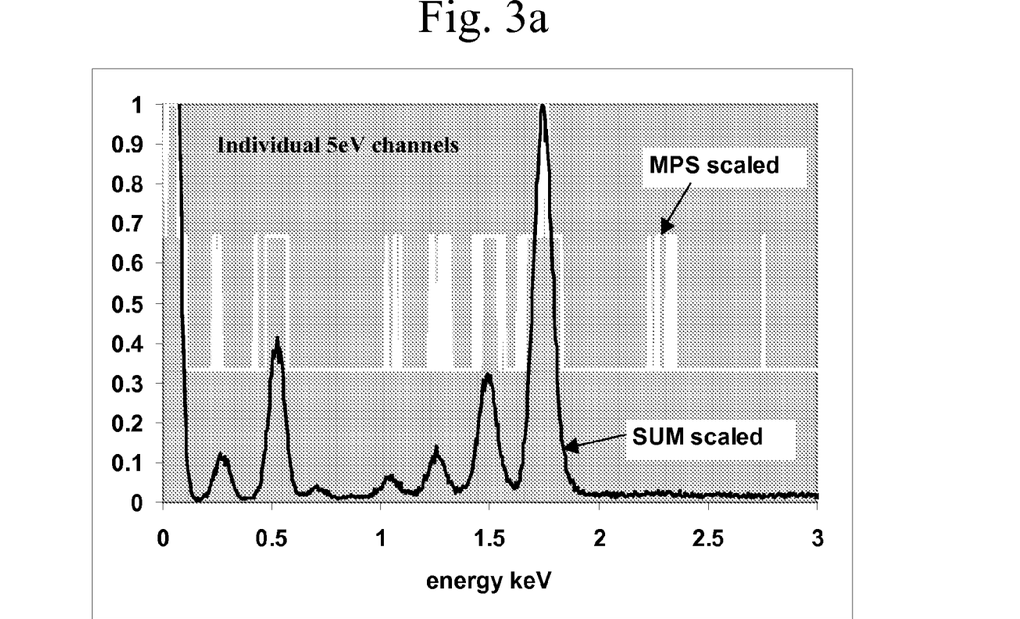
FIG. 3a shows sum and maximum pixel spectra for an x-ray experiment with low average count values according to the prior art.
Figure 3B:
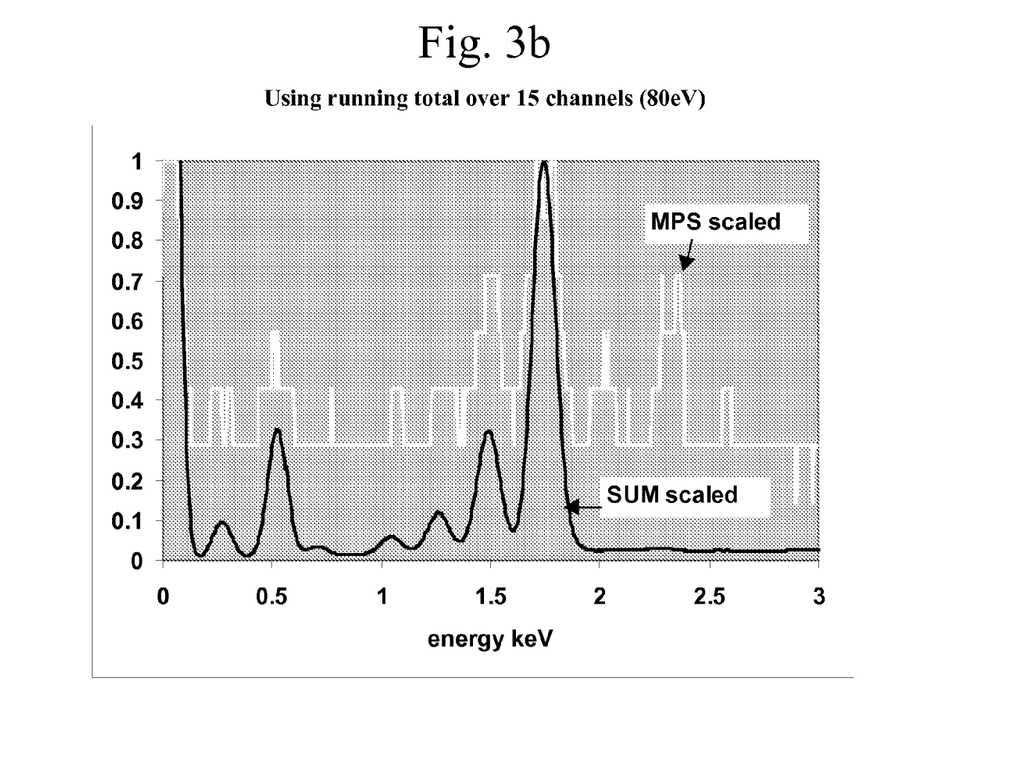
FIG. 3b shows a modified sum spectrum using contributions from 15 channels for each channel according to the prior art.

FIG. 3a shows the results of an experiment where data have been recorded for a total of one minute on a grid of 256×192 pixels at an average count rate of 2500 counts per second (cps). The spectra contain 2048 channels, each of 5 eV width. In this case the MPS and SUM spectra have been scaled to the Si K peak at 1.74 keV. The mean count for the Si K peak channel is only 0.04 counts per pixel and the maximum over all pixels is 3 counts. The scaled MPS shows discrete levels corresponding to 1, 2 and 3 counts and does not look like a typical x-ray spectrum. In this example, typical x-ray peaks are much broader than the 5 eV channel width and, as Bright & Newbury suggest, each channel count can be replaced with the total of several channels symmetrically disposed about the channel energy. This reduces statistical scatter at the expense of energy resolution and the total over this symmetric set of channels is used instead the channel value when computing the MPS for each energy channel. In FIG. 3b, a total for 15 channels covering an energy region of 75 eV in width is used for every channel in a pixel spectrum. In this case, the mean for the Si K peak is now 0.56 counts over all pixels and the maximum over all pixels is 7 counts. Although the scaled MPS now demonstrates characteristic peaks at 1.5 and 1.74 keV, in the rest of the MPS it is not obvious what structures represent real elemental peaks and what is just statistical noise.

A problem with MPS occurs because when the underlying average count per pixel is much less than 1, the maximum can only take values of 0, 1, 2 etc and therefore can be orders of magnitude greater than the mean. In contrast, when the average count per pixel is much greater than 1, the maximum will only be slightly greater than the mean. Therefore, in general, there is no single scale factor that will allow the MPS to be compared with the sum spectrum in order to detect differences from average behaviour over the field of view. Furthermore, with low count data, the MPS is so noisy that it is not always possible to decide whether an elemental peak is present or absent.

Thus there are a number of known techniques for producing spectra in order to visually allow the determination of structure or compositional information relating to the object from which the spectrum is obtained. Some of these techniques have been combined so as to provide additional information to a user. However, despite this, there remains a need to provide an effective method which can be used to indicate which parts of a spectrum actually relate to underlying structure within the data.

SUMMARY OF THE INVENTION

In accordance with a first aspect of the present invention we provide a method of analysing a dataset of spectra, each spectrum comprising a count value for each of a number of parameter values within a parameter range, so as to identify one or more parameter values that exhibit a significant variation within the dataset, the method comprising:

a) obtaining a dataset of spectra;

b) applying a statistical analysis to the count values for each of the parameter values, the result of the analysis for each parameter value being a function of the variation in the count values; and c) displaying together:
  i) a spectrum that is representative of at least part of the dataset of spectra; and
  ii) the results of the statistical analysis.

We have realised that, by analysing the data statistically for each of the parameter values so as to distinguish between counting statistics and underlying structure, and by displaying the results of such an analysis for each parameter value together with spectrum representative of the dataset, it is possible to indicate directly to a user which parts of the spectrum are of interest. This is advantageous since it does not require the user to repeatedly select regions of the spectrum for further analysis in terms of pixel maps for example. Rather, with the use of the present invention, the selection of regions for further analysis can be guided by the statistical results. Furthermore, the invention removes the necessity of displaying multiple spectral types in applications where simplicity is required. The invention therefore provides a method for automatically identifying to a user those regions in the displayed spectrum where there is significant variation in "intensity" (count values) over a series of recorded spectra. The statistical analysis can be thought of as identifying parameter values where there are significant fluctuations in the series of count values for different spectra that are beyond those expected from statistical variation.

The invention therefore works by testing the hypothesis that the underlying intensity for a specific parameter value such as a detector energy channel, or the sum of a block of energy channels, is uniform throughout the series and equal to the average over the whole series. The test is achieved by inspecting one or more of a number of statistical measures for the series such as the maximum value or the chi-squared statistic as are discussed further below. If these measures are significantly outside the range expected for data from a fixed intensity source, the corresponding energy region is highlighted in some way with respect to the displayed spectrum. A graphical display may be used to show the extent by which the observed variation exceeds that expected from counting statistics.

The statistical analysis results can be derived, used and displayed in a number of ways, these being particularly dependent upon the application in question. For example, the results of the statistical analysis in step cii may displayed as a second (modified) spectrum which can be overlaid or displayed adjacent the first. Such a spectrum may be a similar type of spectrum as is displayed in step ci (for example a SUM spectrum), as modified by mathematical combination with the results of the statistical analysis.

In one statistical analysis method, the following steps are performed for each parameter value:

i) determining the mean average count value, and an extreme count value for the dataset of spectra, and ii) calculating a predicted extreme count value using the mean average count value for the dataset of spectra and an assumed distribution of data.

In this analysis an evaluation is therefore made of an extreme count value for each of the spectra for a particular parameter value, typically this being the maximum number of counts. This can then be compared with a predicted extreme count value for a given mean and assuming a statistical distribution of the data. In one embodiment the calculation of the predicted extreme count value is further based upon the number of spectra present within the dataset. Since the invention finds particular application for small count values, advantageously the count values used in the statistical analysis may include count values from one or more other adjacent parameter values symmetrically disposed about the particular parameter value being considered.

This particular statistical analysis not only identifies parameter values for which the spectra exhibit statistical significance, the likelihood being therefore that underlying structure is present, but also provides a convenient means of applying a scaling factor. The results of the statistical analysis in step cii may therefore be displayed as a second spectrum scaled as a function of the ratio of the determined and predicted extreme count values.

The parameter values that exhibit a significant variation can therefore be selected by a user by visual inspection of the displayed spectrum and statistical analysis results. This is applicable to all types of statistical method disclosed herein and is particularly applicable to the use of a scaled spectrum where the difference in peak heights between the original and scaled spectrum are visually apparent.

A further level of sophistication can be applied by the inclusion within the statistical analysis of a statistical significance test so as to determine whether the variation between the different count values exceeds a predetermined threshold. One statistical significance test comprises, performing the following steps for each parameter value:
i) determining the mean average count value, and an extreme count value for the dataset of spectra,
ii) calculating a probability threshold above which any determined extreme count value is deemed statistically significant, the threshold being calculated based upon the number of spectra, and
iii) comparing the extreme count value determined in step (i) with the calculated probability threshold.

Another example includes the following steps, for each parameter value:
i) calculating a chi-square sum based upon the count value in each spectrum and the mean average count value for all of the spectra; and
ii) comparing the chi-square sum with an expected chi-square sum based upon a predetermined probability threshold.

Yet another example comprises, for each parameter value:
i) generating a frequency histogram of the count values for the spectra;
ii) using a statistical measure (typically a chi-square measure) to compare the frequency histogram with an expected distribution (typically a Poisson distribution) of count values; and
iii) comparing the statistical measure with an expected measure for the said expected distribution based upon a predetermined probability threshold.

Since different statistical tests typically find benefit for determining statistical significance for different types of underlying structure, a further embodiment is to combine one or more tests. Where a chi-square test is used in the above examples, the chi-square calculation may be modified to take into account the difference between Normal and Poisson distributions for low average count values.

The invention finds particular benefit therefore when the mean average count value for a particular parameter value is less than 1.

The probability threshold against which the calculations are compared may be selected by a user. Typically the predetermined threshold is chosen so that, were the spectral data representative of a constant intensity source having an intensity equal to the sample mean, there is only a 1% probability that the calculated result would exceed the threshold. Of course, the threshold may be set at other low values such as 2%, 0.5%, 0.1% and so on, depending upon the dataset and the degree of certainty required by the user.

Once the results of the statistical analysis (including the significance test) have been determined, preferably each of any parameter values for which the significance test result exceeds the predetermined threshold are selected and these selected values are indicated upon the display in step cii. In addition, those parameter values for which the predetermined threshold of the statistical significance test is not exceeded may also be indicated in a manner which distinguishes them from those that pass the test.

It will be appreciated that various methods may be used to display the statistical analysis results of step cii. These include textual methods but preferably are graphical. In one example the selected parameter values are indicated in step cii by visually modifying the respective parts of the spectrum of step ci. This may be achieved by highlighting in some manner such as applying different colouring, shading or other effects to the selected part of the spectrum. Where the spectrum itself is not modified graphical markers may be used to indicate the parts of the spectrum to which the parameter values relate, such markers including lines or symbols, with or without the use of colours. A second spectrum, modified by the statistical analysis results (including displaying only parts of the spectrum for which the parameter values pass the test) may also be used. The highlighting, marking or other indications may also be arranged to be scaleable with the spectrum of step ci so that viewing or manipulating the displayed spectrum does not cause the display of the statistical results to be lost.

The displayed spectrum in step ci may take any form and is typically of a type selected from the group of a sum spectrum or a maximum pixel spectrum or the average spectrum or a smoothed spectrum of any of these types.

The spectral dataset may be derived from any type of source, including computer simulation, although typically the spectra represent measured data from a detector. In many cases each spectrum of the spectral dataset represents a pixel within a detector array. Once the parameter values of statistical significance have been displayed, the method preferably further comprises selecting one or more identified parameter values and displaying a pixel map using the count values of the spectral dataset at the one or more selected parameter values. This allows visualisation of the regions of the sample within the field of view relating to the selected parameter values.

Since the spectra may be of any type, the parameter values may likewise represent different types of parameter. Preferably the spectral dataset is selected from the group of a gamma ray, x-ray, ultraviolet, light, infra-red, photon, electron or ion spectrum datasets. Thus normally, the parameter values represent values of a variable within a range, such as values of energy. In the case of a multichannel detector, the parameter values represent energy channels within the detector.

The invention may be implemented on any suitable spectrum analysis system such as one including a personal computer or workstation. The invention may therefore be embodied as a computer program comprising computer program code means for performing the method according to the first aspect of the invention, when said computer program is executed upon a computer. Thus the computer program may be embodied upon a computer-readable medium.

We therefore provide, in accordance with a second aspect of the present invention, a system for analysing a dataset of spectra, each spectrum comprising a count value for each of a number of parameter values within a parameter range, so as to identify one or more parameter values that exhibit a significant variation within the dataset, the system comprising:
   a) a processor for performing the steps of:
      i) obtaining a dataset of spectra including count values for each of a number of parameter values;
      ii) applying a statistical analysis calculation to the count values for each of the parameter values, the result of the analysis for each parameter value being a function of the variation in the count values; and
   b) a display, in communication with the processor for displaying together:
      iii) a spectrum that is representative of at least part of the dataset of spectra; and
      iv) the results of the statistical analysis.

The system is therefore typically a computer-based system since this provides a convenient platform for performing the inventive method. The display may take a number of different forms including a computer monitor, printer, or other device providing a visual output. The use of a computer monitor is useful since the user may then manipulate the spectrum of step ci and the displayed results of step cii with an input device such as a mouse, keyboard, sensor pad and so on. The input device may also be combined with the display as a touch screen.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

Some examples of a method and system according to the invention will now be described, with reference to the accompanying drawings, in which.

DETAILED DESCRIPTION

Figure 4:
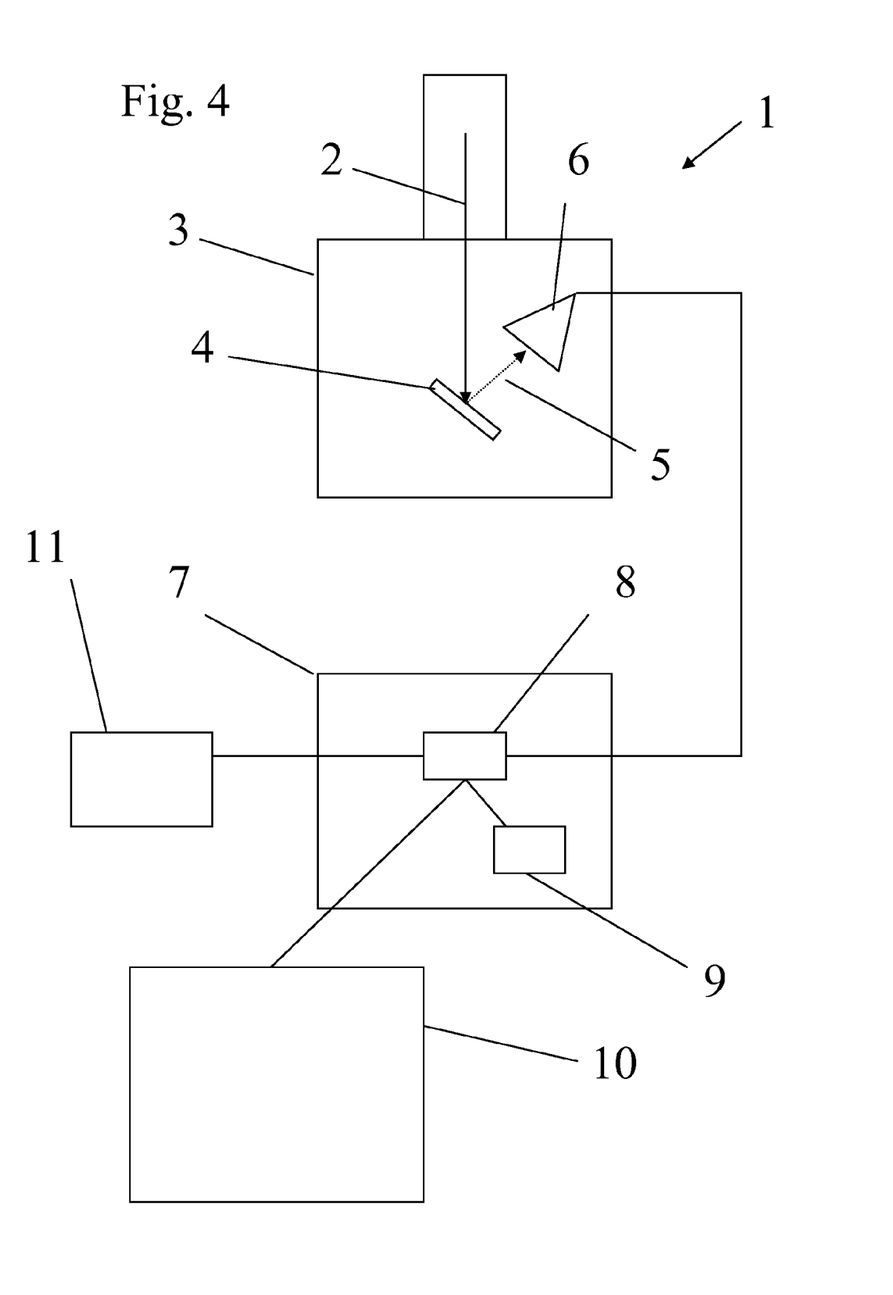
FIG. 4 is a schematic representation of a spectrum analysis system according to the invention.

A number of embodiments of the invention will now be described in accordance with FIG. 4. FIG. 4 is a schematic representation of a spectrum analysis system, generally indicated at 1. An electron beam 2 from the column of a scanning electron microscope 3 is incident upon a sample 4. The sample 4 emits characteristic x-rays 5 which are received at a multichannel array detector 6 of an EDS system. A suitable EDS system (and software) is for example INCA Energy manufactured by Oxford Instruments Analytical Limited, UK. The system comprises a computer 7 including a processor 8 and local memory 9, together with a monitor 10 and input devices such as keyboard and mouse (generally indicated at 11).

Figure 5:
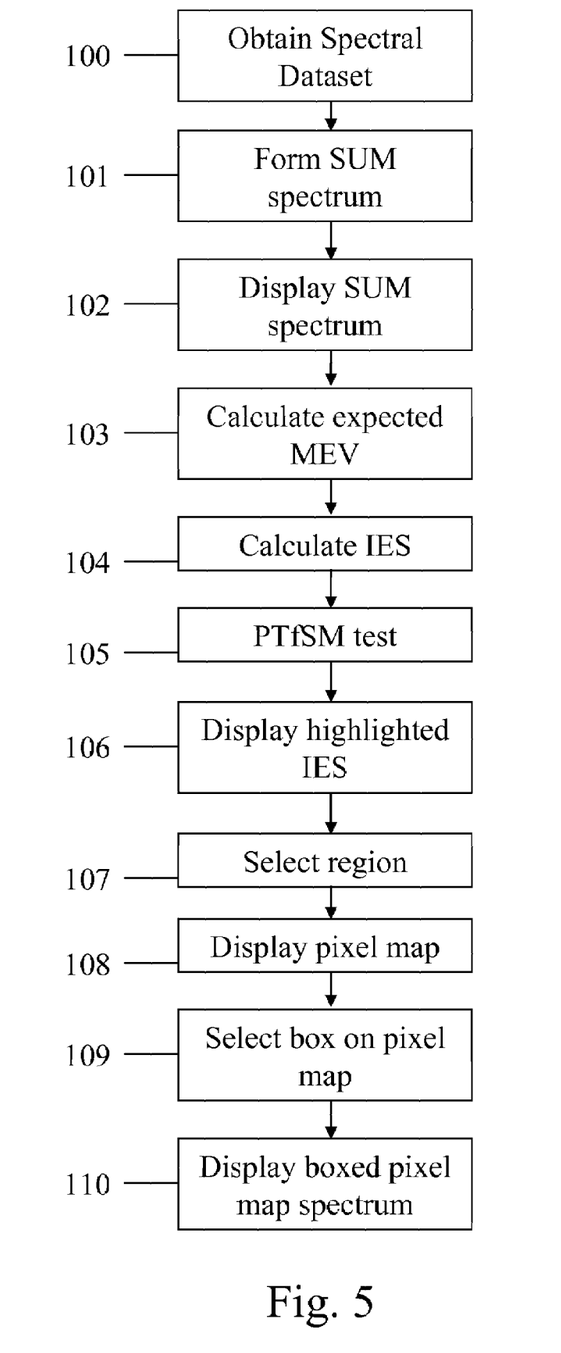
FIG. 5 is a flow diagram of a method according to the invention.

Referring now to FIG. 5, which shows a flow diagram of the method according to a first embodiment, at step 100 the computer 7 receives energy channel data from each pixel of the multichannel detector. This is processed into an energy spectrum, in which count values are represented for each channel (parameter value) from the array. Each channel therefore represents an x-ray spectrum energy band in a known manner.

In order to form a SUM spectrum for analysis (in the conventional manner), at step 101 the sum spectrum values are calculated over the field of view by considering each energy channel and summing all counts obtained for that channel in every pixel of the spectrum image. When the same specimen and data are used as for FIGS. 1, 2, 3a and 3b, the SUM spectrum appears as the dark line in FIG. 6 (upper). This SUM spectrum is displayed on the monitor 10 at step 102.

The invention includes a statistical analysis of the spectral data in order to determine variations between the spectra that are the result of underlying structure.

One such statistical analysis method according to the first embodiment considers the maximum observed in the data over a series of Np data values, with Np being the number of pixels recorded in a spectrum image representing a region of the sample 4. If the intensity received by the detector for any particular channel is constant, the data will consist of random values distributed according to a Poisson probability distribution with a certain mean. The maximum of the Np data values will itself be a random variable that can change from one series of Np data values to another series, for example if the test were repeated. The expected value of the maximum over many series is the "mean extreme value" or MEV.

Figure 7:
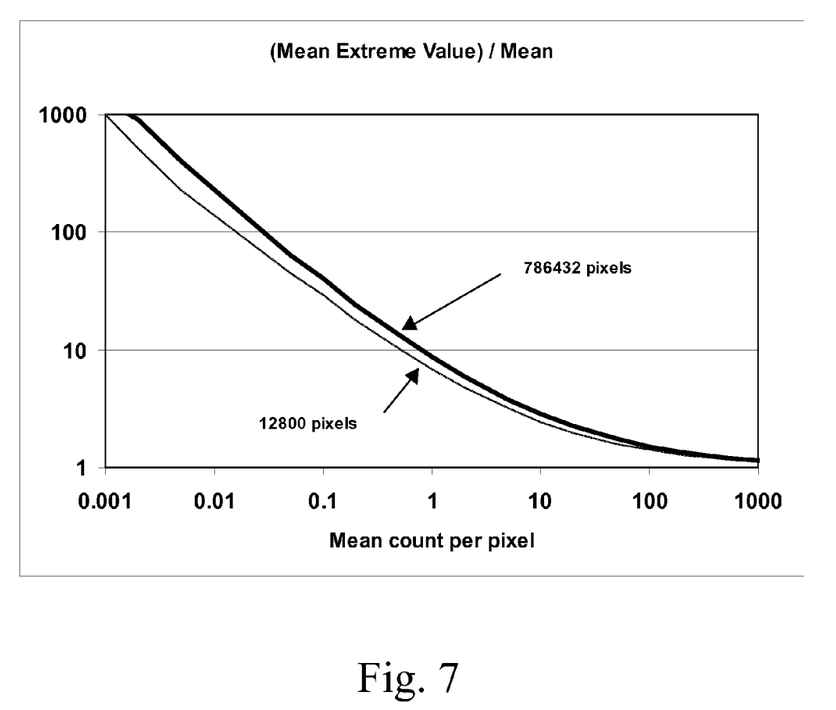
FIG. 7 shows the behaviour of the ratio of mean extreme value to the mean.

FIG. 7 shows a plot of how MEV varies with the mean underlying intensity. Two curves are shown, one for Np=786432 and the other for Np=12800. In this case the data points are referred to as "pixels" as would be the case for a spectrum imaging application. When there are more points in the series, there is more chance that the maximum will reach a higher value so the curve for Np=786432 is higher. For a mean value of 1000, the Poisson distribution is close to a Normal distribution with mean 1000 and standard deviation 31.6. Since values greater than 4 standard deviations from the mean are very unlikely, the maximum would be expected to be no more than about 4 standard deviations greater than the mean so that MEV/mean is no more than 1.13. In contrast, for a mean value of 0.01, a sequence of Np values will usually have a maximum of 1; thus, MEV is likely to be close to 1 and the ratio MEV/mean is close to 100.

FIG. 7 demonstrates why, even when there is no variation in underlying intensity from pixel to pixel, a maximum pixel spectrum (MPS) does not always look like the sum spectrum obtained from the same data. The sum spectrum is simply a scaled version of the average spectrum where each channel represents the mean over all Np pixels. At the top of peaks, the mean is high and MEV/mean ratio will be much smaller than in the spectral background regions where the mean is low and MEV/mean is much greater. Therefore, when the MPS is scaled to the sum spectrum at the highest peak, the lower count regions in the scaled MPS are much higher than the same regions in the sum spectrum. In situations with generally high count levels, this effect is small but in a low count level example, such as in the experiment described in association with FIG. 3a or 3b, the differences in MPS and sum spectrum shape are severe.

Thus it can be seen that the calculation of MEV provides useful information to explain the magnitude of the MPS relative to the sum spectrum.

At every pixel, the sum over several channels symmetrically disposed about the energy channel in question is inspected. The number of channels for this sum can be varied according to the channel energy and is typically chosen according to the width of a typical x-ray peak. In the energy region shown in FIG. 6, 15 channels are used for summing over the channels The sample mean ("MEAN") over all pixels is then determined for this data set of summed values. From MEAN, the expected mean extreme value, MEV, is calculated using a graph similar to FIG. 7 where the total number of pixels is used to choose the appropriate curve. The sample maximum value ("MAX"), of this data set of summed values is also calculated over all pixels. This is performed at step 103.

A new spectrum which we have denoted an "interesting energies spectrum" or "IES", is then formed by multiplying each sum spectrum channel value by the factor, MAX/MEV. Specifically, the channel value for the IES of the first embodiment is calculated as:

(sum spectrum channel value)×(MAX/MEV)

If there is no variation in underlying intensity from pixel to pixel, then the IES will look similar to the sum spectrum, apart from fluctuations due to the statistical variation in sample maxima for each channel. Under the same conditions, a scaled MPS does not look similar to the sum spectrum, especially when count levels are low.

If the underlying intensity is not constant for all Np data values, the MAX/MEV will in general exceed 1. This can be understood by considering the hypothetical case where the underlying intensity takes on two alternative values Ma and Mb where Mb>Ma. Here, the maximum over the Np pixels is likely to be one of the pixels corresponding to the higher Mb intensity and if all pixels were from Mb, the ratio of MAX/(MEV for intensity Mb) would take values around 1. However, since the sample mean will fall between Ma and Mb and thus be less than Mb, the MEV calculated from FIG. 7 for the sample mean will be less than MEV calculated for intensity Mb. Therefore, the ratio of (sample maximum)/(MEV for sample mean) will be greater than 1 when there is variation in underlying intensity. This means that the IES will rise above the sum spectrum for the "interesting energy" channels where there is variation (underlying structure) in intensity throughout the image and to this extent an IES can be regarded as an "interesting energies spectrum". Even if the large variation in intensity only occurs in a single pixel, the IES values will exceed those for the sum spectrum. The extent to which the IES exceeds the sum spectrum shows how far the envelope of observed values exceeds that expected if the underlying intensity never varied. Thus, an IES based upon the statistical analysis of the predicted and maximum extreme values offers advantages over MPS in that it will match the appearance of the sum spectrum at both high and low count levels when there is no underlying intensity variation and will still rise above the sum spectrum wherever there are a few pixels of high intensity within the spectrum image.

The IES still exhibits fluctuations due to statistics and, in this first embodiment a statistical test is made to decide where excursions within the data are likely to be due to real intensity variation rather than statistical fluctuation. In this first embodiment the test considers the statistical distribution of values for a constant underlying mean intensity. At each pixel, the value is the result of one "trial" that would be governed by this distribution. If the calculated probability that the observed sample maximum would never be reached or exceeded in Np trials is 99%, then there is a 99% chance that the sample maximum is caused by real intensity variation rather than statistical fluctuation. This "Percentile test for sample maximum" or "PTfSM" can be used to highlight those energy regions in spectra where the excursions are likely to be due to real intensity variation. The PTfSM test is performed at step 105 in FIG. 5. The IES is then displayed on the monitor 10 at step 106.

This highlighting can be achieved by techniques such as using a different colour for the line, using shading or only displaying the IES in the regions where the PTfSM shows that the variation exceeds that expected from statistics.

The significance test is performed by using MAX and MEAN and Np to calculate PTfSM and if the confidence level is 99% or greater, the IES is displayed. This is shown in the spectrum display of FIG. 6 (upper) where the sum spectrum is shown as a dark line and the IES is shown as a white line wherever the PTfSM significance test is passed. In the energy region from 2 keV to 3 keV, the sum spectrum does not show any peaks. However, the IES shows there are some channels where there is 99% confidence of real variation throughout the image. In particular, the block of channels near 2.3 keV suggests the presence of some characteristic x-ray peak and a reference table of elemental x-ray lines suggests this is most likely to be from Sulphur.

Once the IES and SUM spectra are displayed, at step 107 a user can then select a region where the IES indicates the presence of structure (statistically significant variation in the underlying data) using the input device 11 of the computer. A pixel map is then reconstructed at step 108 using only the selected data corresponding to the channels (parameter values) of interest. This may be achieved for example by plotting a symbol for each of the pixels as a function of their corresponding position in the sample 4 and using the intensity or colour of the symbol on the monitor 10 to represent the count values.

Figure 6:
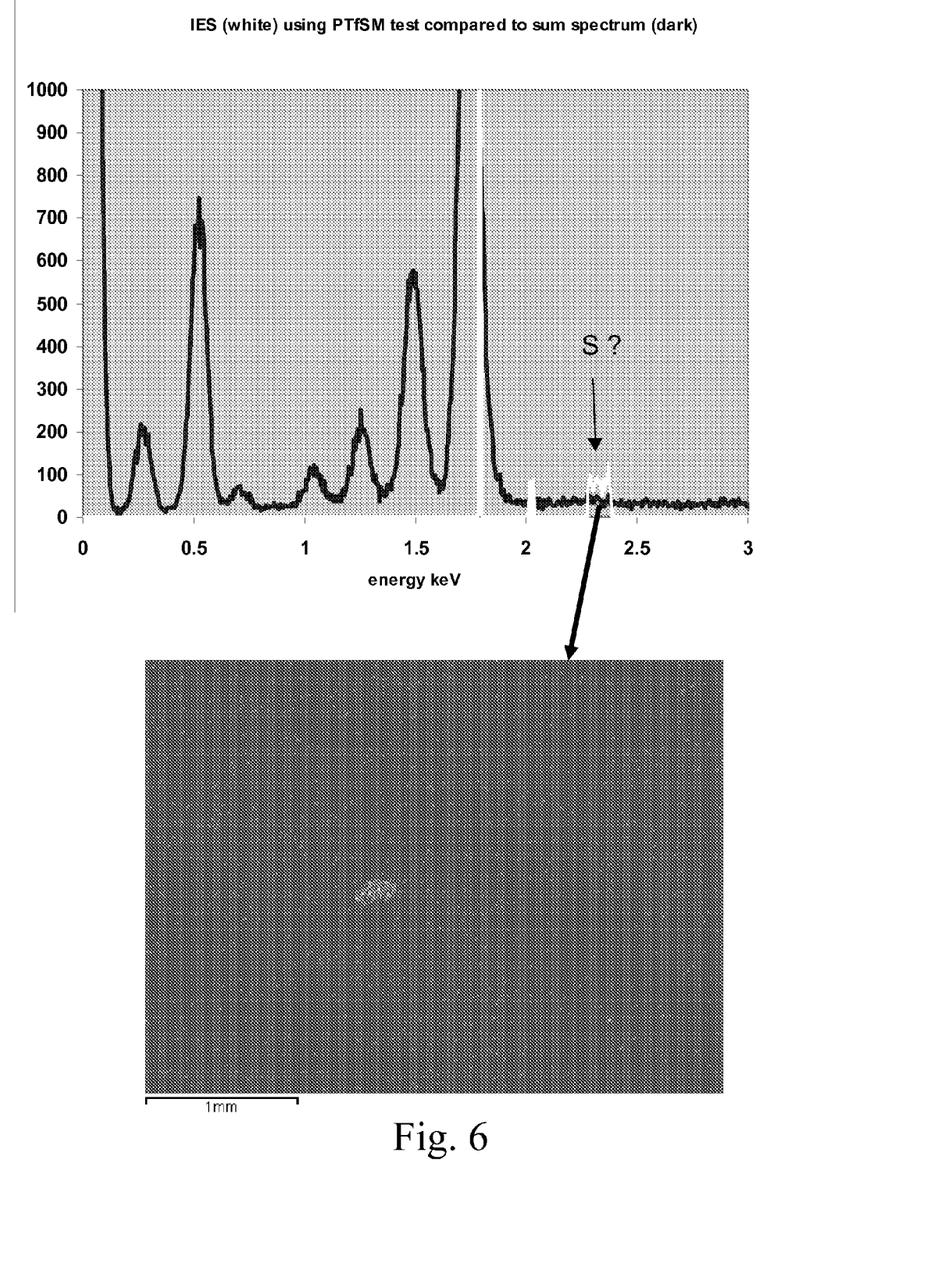
FIG. 6 shows displayed spectra and a corresponding pixel map according to the first embodiment.

As an example of this, in the lower part of FIG. 6, an x-ray pixel map is constructed using an ROI covering the energy region near 2.3 keV exposed by the IES. This shows that there is a small region near the centre of the image where pixel spectra do have much higher counts for this energy band than in the rest of the image. Further analysis is performed at step 109 where, under the control of the user, the spectra from this region are selected (for example by dragging a box over them using the display) as shown in the upper part of FIG. 8.

Figure 8:
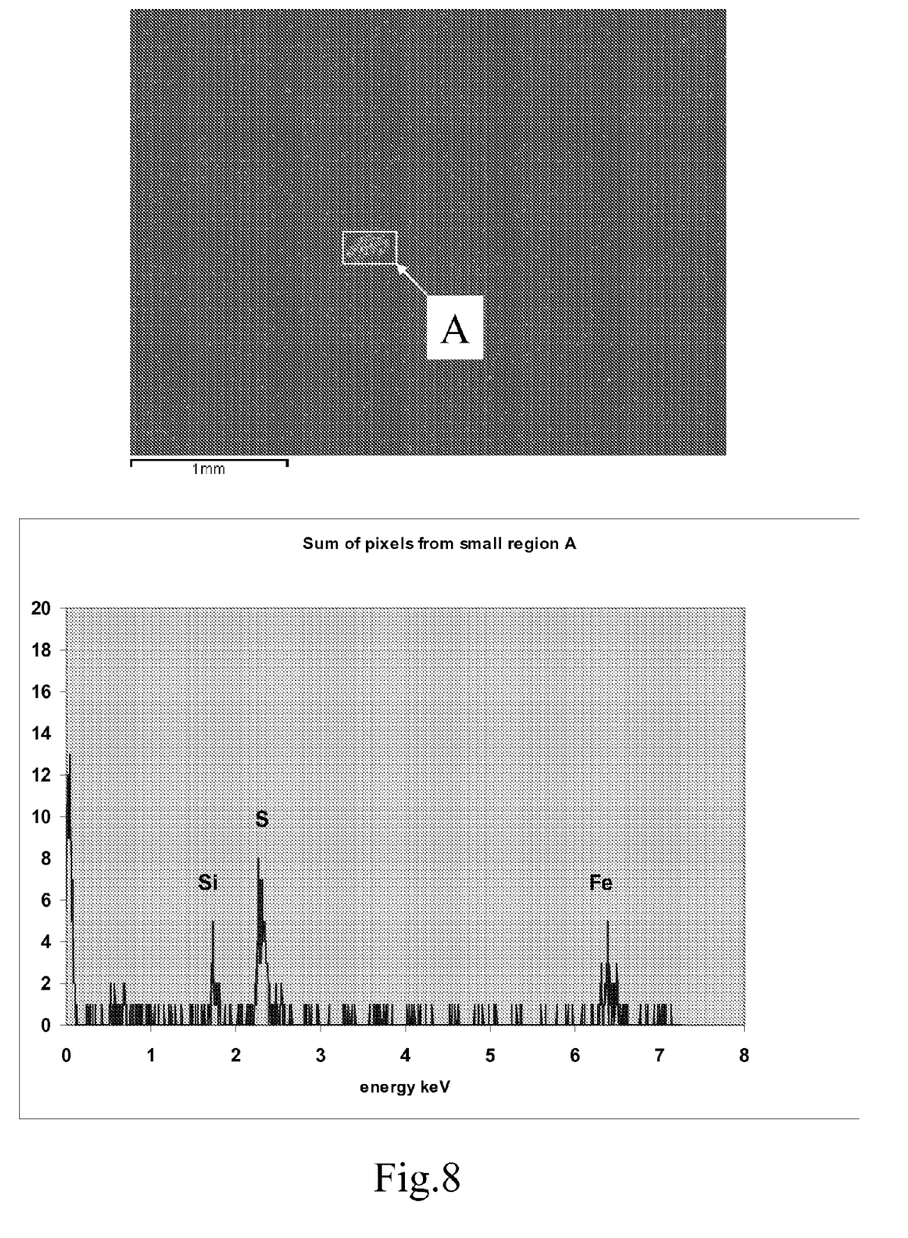
FIG. 8 shows a boxed region within a pixel map and the corresponding spectrum.

At step 110, the spectra from this boxed region are summed together, the resulting spectrum being shown in FIG. 8 (lower) where it is now clear that spectra from this region are quite different from the sum spectrum. The aggregate spectrum from the small region A confirms that sulphur characteristic x-rays are strong in region A. There are additional strong peaks corresponding to Si and Fe unlike the sum spectrum shown in FIG. 2.

It will be understood that the PTfSM test will be particularly effective if there are a very small number of pixels with a large difference in intensity from the mean. However, if there are large areas with similar but different intensity, the PTfSM will not work well.

Other statistical tests may therefore be used for step 105 of FIG. 6. For example, in a second embodiment, a chi-square test can be used in which the sum ("X2") is calculated using every pixel as $$X2 = \Sigma i[(Si-MEAN)^2/MEAN]$$

where Si is the sum over the several channels in question for the spectrum at the i'th pixel. Rather than using a sum over a group of channels, X2 can alternatively be evaluated according to a third embodiment, as $$X2 = \Sigma i[(Ni-mean)^2/mean]$$

where Ni is the count for pixel i and mean is the average count over all pixels.

In these second and third embodiments, if the intensity were uniform, and sufficiently large, for all pixels, then X2 would be distributed according to a chi-square distribution with (Np−1) degrees of freedom. If the cumulative probability that the observed X2 would be achieved or exceeded is less than 1%, then there is 99% confidence that the observed X2 is a result of real intensity variation rather than statistical fluctuation.

Alternatively, in a fourth embodiment, an even more sensitive chi-square measure can be obtained by the recording a frequency histogram of count values for all pixels and comparing the observed and theoretical frequency distributions (see "Numerical recipes in C", 2nd Edition, William H. Press et al., Cambridge University Press, ISBN 0 521 43108.5, p620). This is done by constructing a frequency histogram from the Si (or alternatively the Ni) values and testing the chi-square "goodness of fit" of the histogram to the theoretical Poisson distribution expected for a constant intensity equal to the sample mean. For a "histogram chi-square test", the cumulative probability for this chi-square statistic is used to establish whether the observed variation exceeds that expected if the intensity were uniform throughout.

As for the first embodiment, the second, third and fourth embodiments can again be used with the IES or conventional spectra.

For very low values of mean intensity, the chi square measures of the second, third and fourth embodiments need to be modified to take account of the difference between Poisson and Normal distributions (see for example, K. J. Mighell, The Astrophysical Journal, 518, 380-393, (1999), and L. B. Lucy, Mon. Not. R. Astron. Soc. 318, 92-100 (2000)).

Since the different tests are sensitive to different types of variation, it is useful to be able to use one or more tests in combination to find what type of variation has caused the significant departure from a uniform distribution. For example, as discussed, a PTfSM test can be used to pick out energy regions for an IES where there is a small number of pixels which differ greatly from the average. A chi-square test using X2 may be used due to its sensitivity to a large fraction of pixels with a small difference in intensity from the mean, and the histogram chi-square test will be the most sensitive to all sources of variation.

In accordance with a fifth embodiment a combination of tests is used. This includes the PTfSM test that is sensitive to a small number of pixels with a large difference in intensity. In order to pick out larger regions with smaller difference in intensity, a significance test is applied using X2 and the cumulative chi-square probability for (Np−1) degrees of freedom, each as described above, and corrected if necessary for the effects of low MEAN counts. If this "chi-square" test shows significant variation at the 99% confidence level, the IES is displayed. If neither PTfSM nor "chi-square" tests is passed, then the corresponding IES channel is not displayed.

Figure 9:
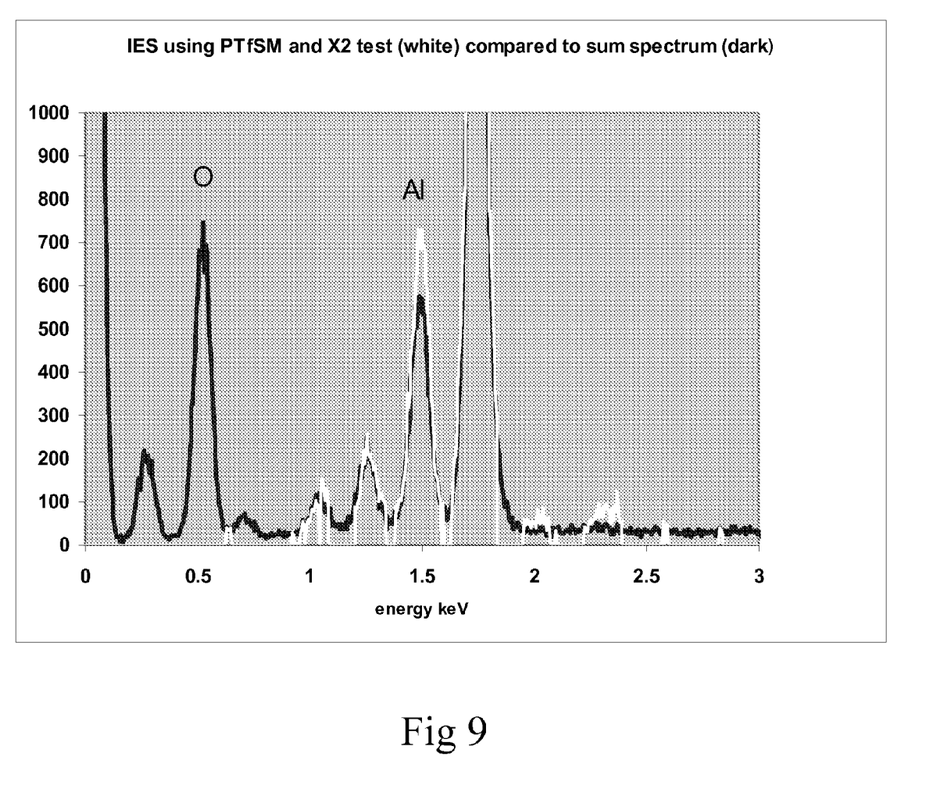
FIG. 9 shows displayed spectra according to a fifth embodiment.

FIG. 9 shows that when the test based on X2 is included, in comparison with the PTfSM test of the first embodiment, then new energy regions are highlighted by the IES. In the energy region of the oxygen peak (O) near 0.5 keV, the IES is not displayed suggesting that there is no spectral variation within the image. This is confirmed by the lack of structure in the oxygen x-ray map shown in FIG. 2. However, in the energy region of the aluminium peak (Al) near 1.5 keV, the IES is displayed showing that there is significant variation throughout the image and this is confirmed by the structure visible in the aluminium x-ray map shown in FIG. 2. Thus, an important benefit of the invention is to delineate those ROI that are likely to give useful x-ray maps.

When compared to the MPS in FIG. 3b, the IES in FIG. 9 has two key advantages:

1) the significance test shows which parts of the spectrum are most likely to be useful for forming x-ray maps; and 2) the scaling by (MAX/MEV) allows direct comparison of IES with the sum spectrum both in higher count regions close to peaks and in lower count background regions of the spectrum.

Inspection of a single graphical view on the monitor 10 identifies where to set energy ROIs for maps that are likely to show spatial variation and thus identify regions in the specimen of different composition. Furthermore, the energy of each peak band delineated by IES can be used to identify elements using an interactive cursor on the display and a look up table of elements and line energies.

While the embodiments describe the invention applied to a 2D spectrum image, it can equally be applied to any set of spectra governed by Poisson counting statistics where it is desired to identify parameter values of the spectrum that show significant variation throughout the data set. X-ray, gamma ray, optical photons or electrons, ions or other fundamental particles may be counted and the spectrum can be any one dimensional array of count values obtained for an increasing sequence of another variable (e.g. wavelength, time, temperature, voltage, magnetic field) where it is desirable to find for what intervals of this variable there is significant variation in the set of spectra. The spectra could be from a 3D array of positions, a time sequence of spectra, a line profile of spectra on the surface of a specimen, a depth profile where spectra are obtained at different depths or a set of spectra obtained at different values of a parameter such as temperature, magnetic field, voltage or current. Besides EDS in SEM, spectral data can be produced by a variety of other techniques that are amenable to this approach, including: X-ray fluorescence, X-ray absorption, Particle Induced X-ray Emission, gamma-ray spectroscopy, Electron Energy Loss spectroscopy, Auger Electron Spectroscopy, Secondary Ion Mass Spectroscopy, X-Ray Photoelectron Spectroscopy, Raman or Infrared Spectroscopy and Nuclear Magnetic Resonance.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method of analysing a dataset of spectra, each spectrum comprising a count value for each of a number of parameter values within a parameter range, so as to identify any parameter values where the corresponding count values exhibit a statistically significant variation within the dataset, the method comprising:

a) obtaining a dataset of spectra;

b) for each of the parameter values of the said dataset, calculating the average count value and then calculating a theoretical probability distribution of count values that would occur solely due to counting statistics, wherein the said distribution has substantially the same average count value as the said calculated average count value;

c) applying a statistical analysis to the count values for each of the parameter values obtained in (a) so as to identify any parameter values that exhibit a statistically significant variation in their count values than would be expected from the corresponding theoretical probability distribution calculated in (b); and d) displaying together:
   i) a spectrum that is representative of the dataset of spectra; and
   ii) the results of the statistical analysis.

2. A method according to claim 1, wherein the results of the statistical analysis in step dii are displayed as a second spectrum.

3. A method according to claim 2, wherein the second spectrum is a similar type of spectrum as is displayed in step di, and is modified by mathematical combination with the results of the statistical analysis.

4. A method according to claim 1, wherein the statistical analysis comprises, for each parameter value,
   iii) determining the mean average count value, and an extreme count value for the dataset of spectra, and
   iv) calculating a predicted extreme count value using the mean average count value for the dataset of spectra and said theoretical probability distribution.

5. A method according to claim 4, wherein the calculation of the predicted extreme count value is further based upon the number of spectra present within the dataset.

6. A method according to claim 4, wherein the count values include count values from one or more other adjacent parameter values symmetrically disposed about the particular parameter value being considered.

7. A method according to claim 4, wherein the results of the statistical analysis in step dii are displayed as a second spectrum scaled as a function of the ratio of the determined and predicted extreme count values.

8. A method according to claim 1, further comprising:
   e) selection by a user of any parameter values that exhibit a significant variation based upon the displayed spectrum and statistical analysis results.

9. A method according to claim 1, wherein the statistical analysis further comprises a statistical significance test so as to determine whether the variation between the different count values exceeds a predetermined threshold.

10. A method according to claim 9, wherein the statistical significance test comprises, for each parameter value:
   i) determining the mean average count value, and an extreme count value for the dataset of spectra,
   ii) calculating a probability threshold above which any determined extreme count value is deemed statistically significant, the threshold being calculated based upon the number of spectra, and said theoretical probability distribution, and
   iii) comparing the extreme count value determined in step (i) with the calculated probability threshold.

11. A method according to claim 9, wherein the statistical analysis comprises, for each parameter value:
   i) calculating a chi-square sum based upon the count values for the parameter and the mean average count value for the parameter for all of the spectra; and
   ii) comparing the chi-square sum with an expected chi-square sum based upon a predetermined probability threshold.

12. A method according to claim 9, wherein the statistical significance test comprises, for each parameter value:
   i) generating a frequency histogram of the count values for the spectra;
   ii) using a statistical measure to compare the frequency histogram with said theoretical probability distribution of count values; and
   iii) comparing the statistical measure with an expected measure for the said theoretical probability distribution based upon a predetermined probability threshold.

13. A method according to claim 9 wherein the statistical significance test is any combination of statistical significance tests selected from the group of statistical tests consisting of:
   for each parameter value:
      determining the mean average count value, and an extreme count value for the dataset of spectra,
      calculating a probability threshold above which any determined extreme count value is deemed statistically significant, the threshold being calculated based upon the number of spectra, and
      comparing the extreme count value determined in said step of determining with the calculated probability threshold;
   for each parameter value:
      calculating a chi-square sum based upon the count value in each spectrum and the mean average count value for all of the spectra; and
      comparing the chi-square sum with an expected chi-square sum based upon a predetermined probability threshold; and
   for each parameter value:
      generating a frequency histogram of the count values for the spectra;
      using a statistical measure to compare the frequency histogram with said theoretical probability distribution of count values; and
      comparing the statistical measure with an expected measure for the said theoretical probability distribution based upon a predetermined probability threshold.

14. A method according to claim 12, wherein said theoretical probability distribution is a Poisson distribution.

15. A method according to claim 12, wherein the statistical measure is a chi-square measure.

16. A method according to claim 11 wherein the chi-square is modified to take into account the difference between Normal and Poisson distributions for low average count values.

17. A method according to claim 1, wherein the mean average count value for a particular parameter value is less than 1.

18. A method according to claim 9, wherein the predetermined threshold is a 1% probability threshold that, were the spectral data representative of a constant intensity source having an intensity equal to the sample mean, a calculated statistical measure for such spectra would fall outside the expected limit.

19. A method according to claim 9, further comprising selecting each of any parameter values for which the count values exceed the predetermined threshold of the statistical significance test, and indicating the said selected parameter values upon the display as step dii.

20. A method according to claim 19, further comprising indicating which parameter values do not exceed the predetermined threshold of the statistical significance test.

21. A method according to claim 19, wherein said selected parameter values are indicated in step dii by visually modifying the respective parts of the spectrum of step di.

22. A method according to claim 1, wherein the displayed spectrum in step di is of a type selected from the group of a sum spectrum or a maximum pixel spectrum.

23. A method according to claim 1, wherein each spectrum of the spectral dataset represents a pixel within a detector array, the method further comprising selecting one or more identified parameter values and displaying a pixel map using the count values of the spectral dataset at the one or more selected parameter values.

24. A method according to claim 1, wherein the spectral dataset is selected from the group of gamma ray, x-ray, ultraviolet, light, infra-red, photon, electron or ion spectrum datasets.

25. A method according to claim 1, wherein the parameter values represent values of a variable within a range.

26. A method according to claim 1, wherein the parameter values represent energy channels within a detector.

27. A method according to claim 1, further comprising a computer program for performing the analyzing, wherein said computer program is executed upon a computer.

28. A method according to claim 27, said computer program embodied upon a computer-readable medium.

29. A system for analysing a dataset of spectra, each spectrum comprising a count value for each of a number of parameter values within a parameter range, so as to identify any parameter values where the corresponding count values exhibit a statistically significant variation within the dataset, the system comprising:
   a) a processor for performing the steps of:
      i) obtaining a dataset of spectra;
      ii) for each of the parameter values of the said dataset, calculating the average count value and then calculating a theoretical probability distribution of count values that would occur solely due to counting statistics, wherein the said distribution has substantially the same average count value as the said calculated average count value;
      iii) applying a statistical analysis to the count values for each of the parameter values obtained in (i) so as to identify any parameter values that exhibit a statistically significant variation in their count values than would be expected from the corresponding theoretical probability distribution calculated in (ii); and
   b) a display, in communication with the processor, for displaying together:
      iv) a spectrum that is representative of the dataset of spectra; and
      v) the results of the statistical analysis.

30. A system according to claim 29, wherein the display is a computer monitor.

31. A system according to claim 29, further comprising an input device, coupled to the processor, for allowing interaction between a user and the processor.

* * * * *